US005608786A

United States Patent [19]
Gordon

[11] Patent Number: 5,608,786
[45] Date of Patent: Mar. 4, 1997

[54] UNIFIED MESSAGING SYSTEM AND METHOD

[75] Inventor: Alastair T. Gordon, Toronto, Canada

[73] Assignee: Alphanet Telecom Inc., Toronto, Canada

[21] Appl. No.: 387,162

[22] Filed: Feb. 13, 1995

[30] Foreign Application Priority Data

Dec. 23, 1994 [CA] Canada ................................. 2139081

[51] Int. Cl.$^6$ ............................................. H04M 11/00
[52] U.S. Cl. ............................. 379/100; 379/90; 358/402
[58] Field of Search .............................. 379/93–100, 88, 379/89, 90; 370/85.13, 110.1, 61, 79; 358/400, 402, 403, 407, 442

[56] References Cited

U.S. PATENT DOCUMENTS

| | | | |
|---|---|---|---|
| 4,837,798 | 6/1989 | Cohen et al. | 379/94 |
| 5,008,926 | 4/1991 | Misholi | 379/100 |
| 5,289,468 | 2/1994 | Yoshida | 370/85.13 |
| 5,309,437 | 5/1994 | Perlman et al. | 370/85.13 |
| 5,406,557 | 4/1995 | Baudoin | 379/89 |
| 5,479,411 | 12/1995 | Klein | 379/88 |

OTHER PUBLICATIONS

IEEE 13th Annual International Phoenix Conference on Computers and Communications—1994, 12–15 Apr. 1994, Phoenix (US), pp. 485–490, XP000462600 Jay Tao et al: "Internet Access Via Baseband and Broadband ISDN Gateways" see abstract.

Connexions, vol. 8, No. 10, Oct 1994, U.S., pp. 20–24, XP000568610 Thierry Turletti: "The INRIA Videoconferencing System (IVS)" see p. 20, line 1–line 17.

Computer Reseller News, 28 Nov. 1994, US, p. 12 XP000560768 Charlotte Dunlap: "AT&T: Internet Can talk Too".

IEEE Infocom 94—The Conference on Computer Communications, 12–16 Jun. 1994, Toronto (CA), pp. 680–688, XP000496524 Ramachandran Ramjee et al: "Adaptive Playout Mechanism for Packetized Audio . . . ".

Proc. of the IFIP WG 6.5 Internat. Symposium, 3–5 Oct 1990, Zurich (CH), pp. 113–123, XP000560986 Alnoor M. Shivji et al.: "Voice Mail Internet–Working Using X.400".

Primary Examiner—Wing F. Chan

[57] ABSTRACT

The present invention relates to a unified messaging system and method which is more convenient and advantageously combines or makes use of existing communication channels or networks. Part of the system and method relies on a data communication network forming an intermediate leg of the distribution network. Telephone communication is typically used for initial or final legs. Voice mail, E-mail, facsimiles and other message types can be received by the system for retrieval by the subscriber. Communications may be centralized and retrieval of messages can be accomplished using one of a number of separate and distinct approaches. Thus, data communication networks such as the Internet can become global voice mail and facsimile mail systems.

18 Claims, 5 Drawing Sheets

UNIFIED MESSAGING SYSTEM AND METHOD

FIELD OF THE INVENTION

The present invention relates to a method and system for unified messaging services, and in particular relates to a system and method which makes voice mail, facsimile mail and E-Mail conveniently accessible to receive as well as to transmit and to allow crossover in both the type of document that is received or transmitted. The retrieval of messages can be accomplished in a number of distinctly different manners whereby the user has significantly more freedom and choice regarding message retrieval.

BACKGROUND OF THE INVENTION

INTERNET™ now provides a network where a subscriber typically contracts with a commercial access provider (CAP) and obtains an Internet address as well as the capability to send and receive E-Mail on Internet and perform other functions which Internet supports. The subscriber typically uses his personal computer and modem to contact the commercial access provider using the public switched telephone network (PSTN), and once connected to Internet, performs the desired functions. The CAP provides an E-Mail box for the subscriber and the subscriber, when connected to the CAP, can review the contents of this electronic mailbox.

E-Mail can be transmitted to other subscribers of Internet located in a host of different countries and provides a cost effective system for transmitting data from one E-Mail subscriber to another across different E-Mail systems nationally or internationally.

E-Mail systems have been available for many years and although they provide a very cost effective alternative to facsimile transmissions, the popularity of E-Mail does not nearly approach the popularity of voice and facsimile messaging and the number of users is many times lower.

Our U.S. Pat. Nos. 4,713,837, 4,922,518, 4,942,599 and 4,969,184 disclose systems for more efficient transmission and/or retrieval of facsimile communications, which can involve the use of dedicated data transmission networks. Facsimile transmissions have been rerouted in the case of long distance transmissions to a computer which uses a data communication to provide a more effective link to another computer which then uses the public switched telephone network to phone out and complete the transmission.

Companies have examined the approaches for conducting business and, in many cases, it is now felt that certain individuals within the company require their own private facsimile address as well as a convenient mechanism for receiving voice mail. Confidentiality may also be important. Office workers have also become much more familiar with computer equipment and have become more comfortable using the computer equipment to transmit or receive certain messages or conduct searches on different electronic databases.

The present invention has recognized the need for a system of transmission and central approach for combining these different message types. The invention also allows the many millions of facsimile machines throughout the world to be more cost effectively accessible by other facsimile machines and computers and where the message type can be in addition to a traditional facsimile message.

SUMMARY OF THE INVENTION

A messaging system according to the present invention having a bank of direct-in-dial (DID) telephone lines associated with a public switched telephone network and a computer system which also acts as a commercial access provider for the Internet or other data communication networks through which digital messages can be delivered. The computer system provides each subscriber with an E-mail address and account for the data communication network, as well as a fax telephone address and a voice mail telephone address, where a communication addressed to any of the addresses results in the computer system receiving and storing the particular message in an electronic messaging mailbox for retrieval by the respective subscriber. The computer system is accessible to any subscriber using the public switched telephone network and/or the data network for retrieval of communications stored on behalf of the subscriber or a summary of the communications whereby the subscribers may contact a single automated source for retrieval of voice mail, E-mail, data files, or facsimile transmissions received on its behalf by the computer system. Similarly, the system is accessible to anyone wishing to leave a voice, facsimile, or other message for the subscriber by dialing the telephone number associated with the subscriber's electronic message mailbox. As a result, data networks, such as Internet, are accessible by devices other than computers, namely by telephones and facsimile terminals.

In the preferred embodiment, the voice mail and facsimile mail telephone addresses are the same and the computer distinguishes between the two types of communications when the in-bound call is received. Use of any of the addresses results in a connection with the commercial access providing computer which stores the addressed communication in an electronic messaging mailbox for retrieval by the respective subscriber. The commercial access providing computer allows each subscriber to access and retrieve communications stored in his electronic messaging mailbox or a summary of communications stored in his electronic mailbox. The retrieval can be carried out using any of (1) a telephone set which forms a telephone communication with a suitable commercial access providing computer, or (2) a computer and modem which forms a telephone communication with a suitable commercial access providing computer, or (3) a facsimile machine which forms a telephone communication with a suitable commercial access providing computer.

According to yet a further aspect of the invention, the commercial access providing computer with respect to some subscribers converts received E-Mail and other communications addressed to the subscriber to a facsimile format such that the messages may be delivered to a predetermined facsimile address designated for receipt of messages sent to the subscriber. In this way, the subscriber can have an E-Mail address which others can use to provide them with information, but he has predetermined that he, on occasion or always, wants to receive this as a facsimile communication or other specified communication.

The communication system can also operate where the commercial access providing computer includes an arrangement for automatically delivering an alert signal by means of a broadcast which is received by the equipment of the subscriber, and the reception thereof instructs the subscriber's equipment to automatically receive the communications by initiating a communication with the commercial access providing computer and then retrieving the communication. In this way, the communication system can provide automatic delivery of communications, given that the subscriber's equipment is available at that time.

This communication system can also work as a global voice mail and fax mail system where, if a particular line is busy or not answered, the call is diverted to a suitable commercial access providing computer which will receive the diverted communication which is forwarded to the communication system. This method uses the call forwarding technology of existing public switched telephone networks, and thus, the communication system provides the subscriber with the ability to receive all communications, including voice and fax messages.

According to yet a further aspect of the invention, the communication system includes at least two commercial access providing computers, each interconnected to the Internet, and wherein the subscribers to the system can access either of the two commercial access providing computers for retrieval of communications stored on behalf of the subscriber. Information is effectively exchanged between the two commercial access providing computers when necessary to allow retrieval of the information by the subscriber by accessing either of the computers. This effective communication between the computers using the Internet, allows a fast, reliable and cost-effective transfer of information. Such a system has the benefit of providing the subscriber with access to the closest commercial access providing computer and can reduce long distance charges as well as improve the quality of the communication channel, as typically a local or shorter long distance call is required to connect with the particular commercial access providing computer. Thus, Internet becomes the transport backbone of a global voice and fax mail system and opens Internet to transparent access by telephones, facsimile terminals and other non-subscriber devices.

The present invention is also directed to a unified messaging system comprising a computer system which is connected to a public switched telephone network and a high speed data communication network through which E-Mail, facsimiles and voice mail may be transferred.

The invention is also directed to a method of transmitting of voice, E-Mail and facsimile messages destined for a particular identified subscriber, which messages are received by a computer system of a commercial access provider connected to a data communication network through which E-Mail is transported. The computer system is also connected to a public switched telephone network by means of which facsimile transmissions and voice transmissions are received and transmitted, and wherein a subscriber may access the computer for retrieval of messages stored in his electronic message mailbox on his behalf. The retrieval of messages can use the public switched telephone network and the data communication network directly connected to access the subscriber's electronic message mailbox or retrieval can use the public switched telephone network to form a direct connection with the computer system for retrieval of messages. This method provides the subscriber with a number of alternatives for accessing his particular electronic message mailbox including using the data communication network to access his mailbox when this is the most desirable or cost effective manner to retrieve the communications.

Internet provides access to millions of computers throughout the world. The present invention, preferably uses Internet and provides access to hundreds of millions of telephones and fax machines resulting in a Global Voice Mail and Fax Mail System in addition to the existing capabilities of Internet.

BRIEF DESCRIPTION OF THE DRAWINGS

Preferred embodiments of the invention are shown in the drawings, wherein.

DETAILED DESCRIPTION OF THE PREFERRED EMBODIMENTS

The term "UniPost" will be used to describe a new type of commercial access provider of the type associated with Internet. UNIPOST™ provides dial-in access to its subscribers through specialized access computers called UniPost Access Nodes (UANs) located in different geographical regions (see FIG. 1). Each UniPost Access Node provides a subscriber with an E-Mail address and account, preferably an Internet address, for example:

jsmith@acmefireworks.com.

This address provides access to the subscriber for other Internet subscribers, and for subscribers to services that have gateways into Internet. In addition, the subscriber is provided with a Personal Mailbox Telephone Number, for example: 1-416-555-1234, and Personal ID Number (PIN): 63265. Therefore, a UniPost subscriber may be provided with the following:

| | |
|---|---|
| Internet Address: | gordon@toronto.unipost.com |
| Personal Mailbox Number: | 1-416-555-1234 |
| Personal ID Number or password: | 63265 |

The UniPost Access Node provides the subscriber with access to all normal facilities of Internet, including E-Mail, databases, conferences, and forums. The UniPost Personal Mailbox Number provides the subscriber with an access point which can receive messages from terminals other than computers, specifically from telephones and facsimile machines. Thus, his Personal Mailbox Number allows for receipt of voice and facsimile messages. With this arrangement, the subscriber can be contacted by the millions of PC users in the world familiar with E-mail, as well as the hundreds of millions of telephone and facsimile devices now in use. Furthermore, the various received communications are received by a centralized system and can be retrieved by the subscriber his or her convenience. The fact that the various UniPost Access Nodes are distributed throughout various countries and the world and connected by the Internet or another commonly available data communication network makes retrieval of messages more effective. Furthermore, each UniPost Access Node can include arrangements for converting of various communications from one form to another making retrieval easier and more flexible. For example, a subscriber may not wish to actually receive E-Mail as E-Mail, but may wish to have an E-Mail address.

When a communication is address to him using the E-Mail address, the UniPost Access Node may convert it to a facsimile transmission and send it out to the subscriber as a facsimile transmission. In this way, the subscriber need not have the capability of receiving all transmissions and can use certain features of the UniPost Access Nodes for conversion of communications received in one form to another form. The UniPost access mode can also provide conversion of facsimile transmissions to E-mail, or E-Mail to speech. In this way, subscribers need not have their own conversion hardware and/or software.

Figure 1:
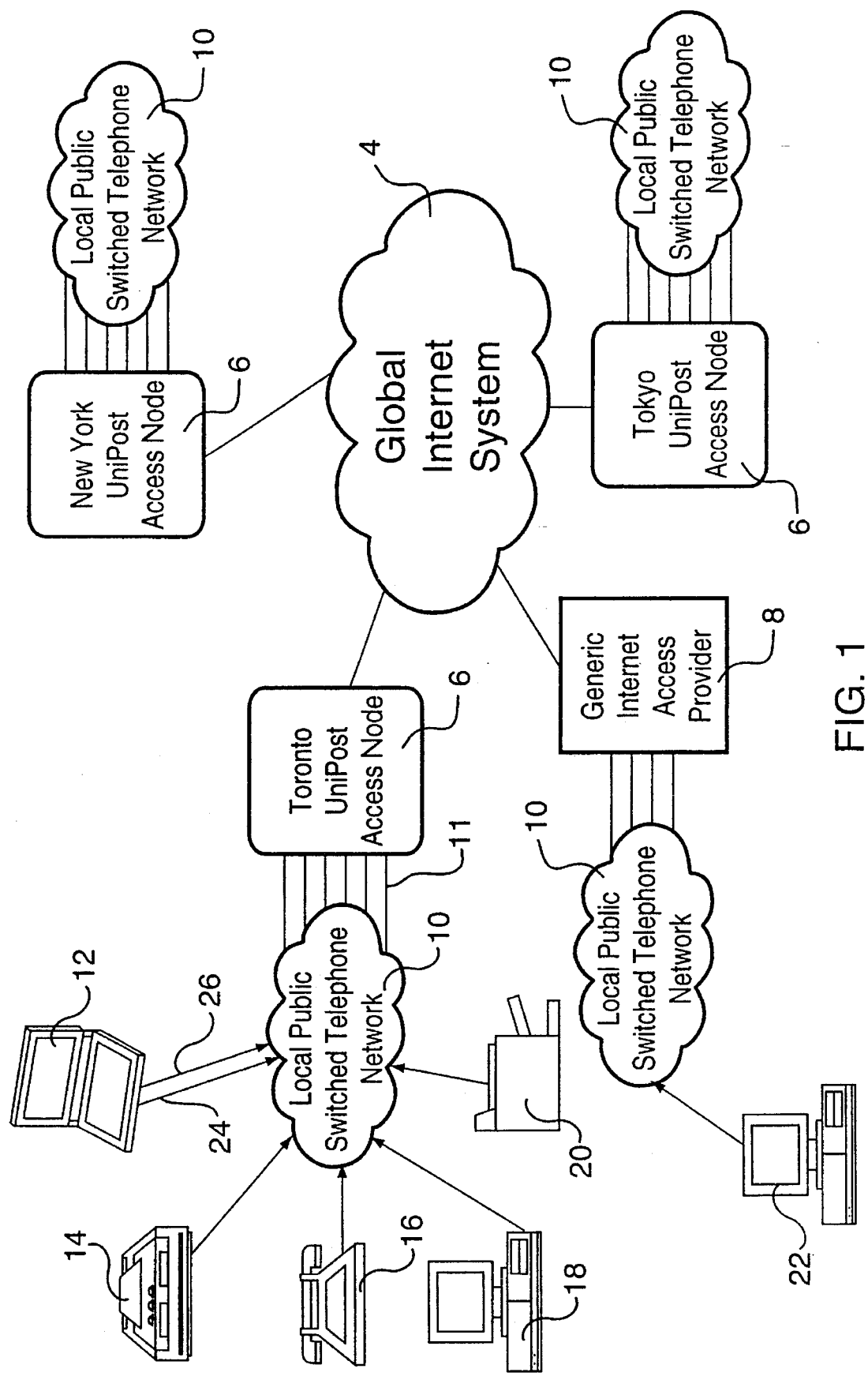
FIG. 1 is an overview of the unified messaging service and how it can interact with a data communication network.

Turning to FIG. 1, the communication system 2 includes the Internet 4, which is a well known communication network. Internet has a number of Internet commercial access providers (CAPs) 8 which each have a host of subscribers who then have access to the various services of Internet typically using their personal computers. The conventional Internet access provider would provide each subscriber with an Internet address and password number for retrieval of E-Mail. One such subscriber 22 is shown using the local public switched telephone network 10 to gain access to the generic Internet CAP for transferring a file to E-Mail subscriber "gordon@toronto.UniPost.com" indicated as 12. This is via the Toronto UniPost Access Node 6, which includes the electronic Mailbox of Gordon. Gordon can either be alerted that an E-Mail communication has been received or may call in to the UniPost Access Node 6 from time to time, as indicated by line 24, go through the necessary protocol with the UniPost Access Node 6 or any UAN worldwide, and eventually receive the E-Mail, or other voice, facsimile, or other messages indicated by line 26.

Messages to the UniPost Internet subscriber 12 can also be made from a facsimile machine 14, from a telephone set 16, from a computer modem connection indicated as 18, or a message via Binary File transfer (BFT) indicated by the apparatus 20. Each of these devices communicate to the UniPost Access Node 6 through the local public switched telephone network 10 and effectively gain access to the electronic mailbox of gordon@toronto.unipost.com provided by the UniPost Access Node. Note that both voice messages and facsimile messages are sent to the same telephone address and Toronto UniPost Access Node 6 distinguishes between these two types of transmissions and stores the communication in the appropriate electronic message mailbox, as will be fully described with respect to FIG. 2. Again, the communications can be accessed by the UniPost Internet subscriber 12 making contact with the Toronto UniPost Access Node 6 or any other UAN worldwide and retrieving of communications that have been received for the subscriber. It can also be appreciated that forced delivery can occur if the subscriber has a piece of equipment which can receive an alert signal and then form a with the UniPost Access Node. In this way, the UniPost Access Node does not have to continue to try to make contact with the subscriber and the subscriber's equipment only calls into UniPost Access Node 6 when a transmission has been received and can now be retrieved. Our earlier patents disclose automatic retrieval of facsimile transmissions which can be used in this application for message retrieval.

The Toronto UniPost Access Node can also deal with the various communications received for a subscriber in different manners. For example, a subscriber may wish to have UniPost Access Node maintain communications for a certain period of time, even after they have been delivered to the subscriber. In contrast, other subscribers may wish to have all messages abandoned once they have been delivered. Therefore, the preferences of the individual subscriber can be accommodated according to selections made at the time of retrieval or according to a predetermined arrangement.

Thus, to a caller calling a UniPost subscriber from a telephone, the UAN will behave like a voice mail system. For callers calling a UniPost subscriber from a facsimile machine, the UAN will behave like a receiving facsimile machine. Likewise, the subscriber can use a telephone, facsimile machine or computer to retrieve his messages from any UAN. A telephone will facilitate playback and management of voice message, indication of other message types and mailbox status, and possibly text-to-speech conversion of E-Mail. A facsimile machine will facilitate retrieval of facsimile messages, display of E-Mail, and notification of other message types and mailbox status. A computer will facilitate retrieval and management of all message types, including voice, facsimile, E-Mail, video and any other file type. UniPost software resident in the computer will allow for the convenient retrieval, playback, viewing, filing and general management of all message types.

A UniPost Access Node 6, which has a host of direct in-dial telephone lines indicated as 11, can also have out-dial lines for contacting of subscribers or destined terminals. The UniPost Internet subscriber 12 need not always be in the form of a portable computer and the subscriber can have his messages delivered to a permanent computer or a facsimile machine, when appropriate. For example, a file transfer from 22 to a facsimile machine of the subscriber can occur where the Toronto UniPost Access Node converts the communication to a facsimile communication and then forwards the communication to the particular facsimile machine. This type of communication conversion occurs transparently to the sender.

Figure 2:
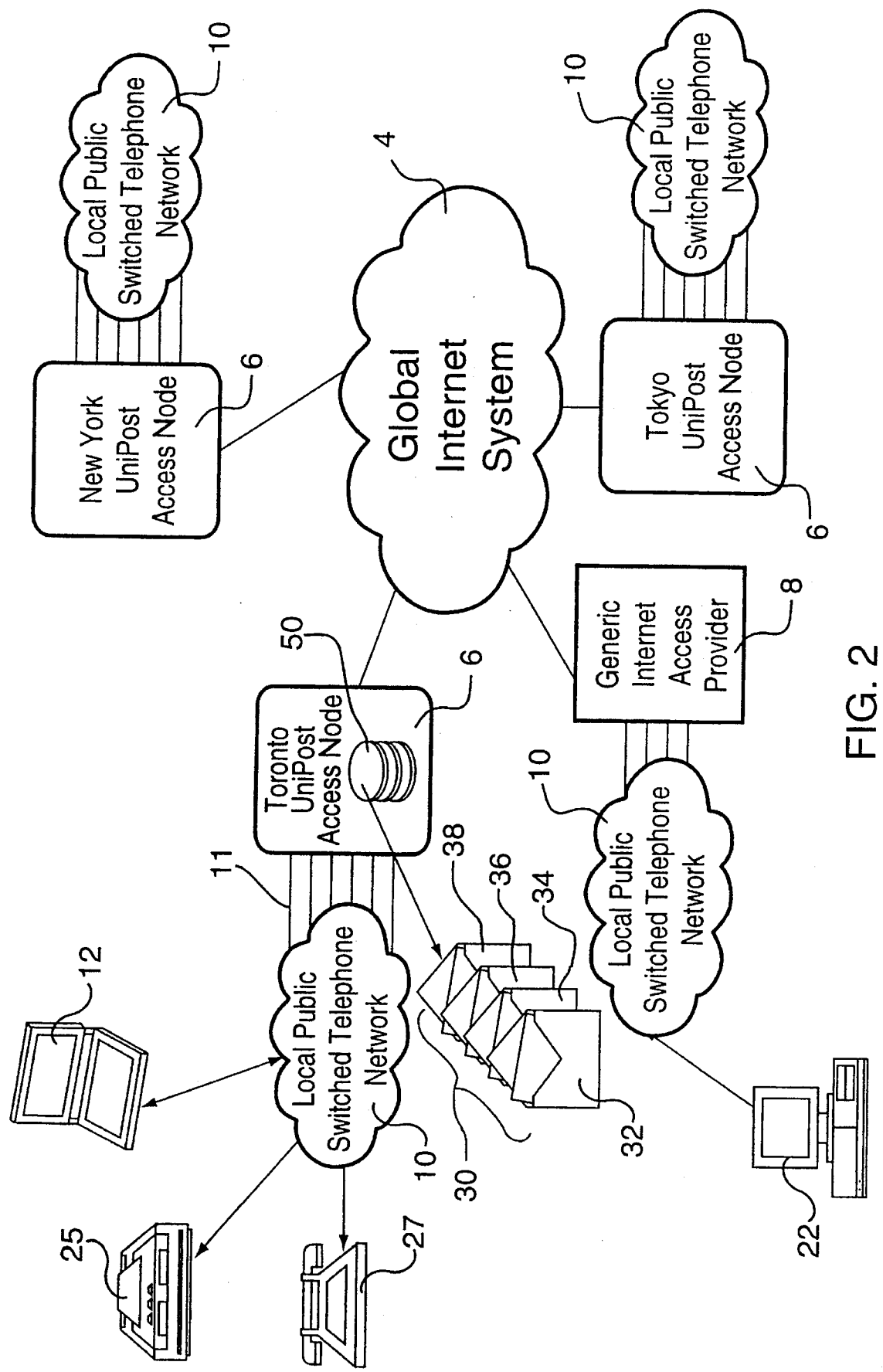
FIG. 2 is an overview showing certain features of the system, and in particular the type of structure used to unify the various communication messages of a subscriber and a common electronic mailbox and the various means for retrieval of the information.

Turning to FIG. 2, it can be seen that the Toronto UniPost Access Node 6 includes a hard disk 50 which is subdivided to provide each subscriber with a separate electronic message mailbox, generally shown as 30. Within the electronic mailbox is, typically, a facsimile in-box 32, a voice in-box 34, an E-Mail box 36 and a facsimile out-box 38. FIG. 2 shows how the subscriber can retrieve various communications stored in his electronic mailbox. The Toronto UniPost Access Node 6 will include a summary of the various messages that have been received for the subscriber. This summary is available to the subscriber in voice form, facsimile form or E-Mail form depending on the type of terminal used for retrieval. The retrieval of messages in the electronic mailbox using a computer and modem shown as 12 can follow the conventional practice, however, E-Mail, voice, facsimile, and other message types can be retrieved by the computer. The facsimile message can be processed using an optical character recognition arrangement within the UniPost 6 to provide a text file, or it can be merely sent as a graphic image. Therefore, the system does provide the computer terminal and modem 12 with the means to retrieve additional communications other than merely E-Mail messages. Furthermore, voice messages may be sent to the computer and replayed through speakers or the voice messages may be converted into text communications.

FIG. 2 also illustrates how the facsimile machine 25 or the telephone set 27 can retrieve information. For example, if the subscriber is at the facsimile machine 25 and wishes to retrieve messages, he can contact the Toronto UniPost Access Node 6, key in his particular password, and direct the UniPost Access Node to send the facsimile message to the machine preferably directly without forming a further communication. On the other hand, the subscriber could use the telephone set 27 to get a summary of messages received as well as any voice messages, and then direct the Toronto UniPost Access Node 6 to send E-Mail or facsimile messages to the facsimile machine 25. Any communications received for the subscriber are placed in the appropriate box within the electronic mailbox 30. Therefore, it can be seen that the Toronto UniPost Access Node 6 and other UniPost Access Nodes have the capability of communicating with the subscriber in a number of different manners and allow him to receive information regarding messages received and for the transfer of the messages to him in a number of forms. The subscriber need not have a computer and modem connection to the UniPost Access Node to effectively have information or messages sent out in a particular manner.

FIG. 2 shows UniPost Access Nodes 6 in Toronto New York and Tokyo. Access nodes can be distributed throughout a country. All major cities may have UniPost Access Nodes. Thus, each country typically will have many UniPost Access Nodes.

Figure 3:
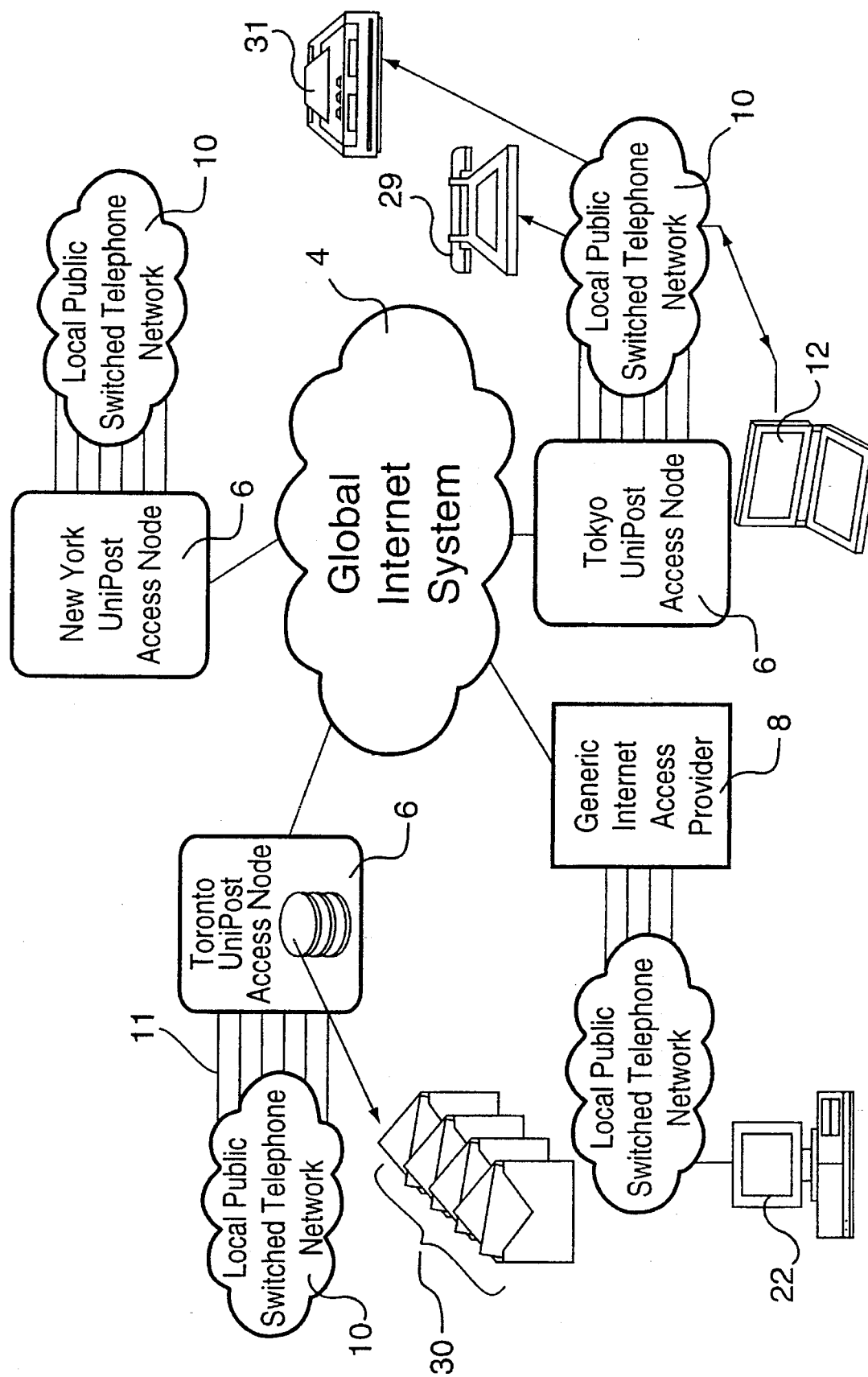
FIG. 3 shows an overview of how the system can be used to effectively connect a subscriber to the data communication network and to his individual electronic mailbox for effective retrieval of messages.

FIG. 3 shows other advantages of the system which are particularly appropriate with respect to subscribers who travel and often are quite distant from their particular UniPost Access Node. In this case, the "gordon@toronto.unipost.com" UniPost Internet subscriber, generally indicated as 12, is in Japan and uses the local public switched telephone network 10 to contact the Tokyo UniPost Access Node 6. After proper identification of the subscriber, the Tokyo UniPost Access Node uses Internet 4 to access the electronic mailbox 30 of the subscriber and allows retrieval of the various contents of the various boxes. For example, the personal computer 12 can receive voice messages, facsimile messages, E-Mail and file transfer, or the Internet subscriber 12 could use the telephone set 29 to retrieve voice messages and possibly the voice summary of messages received and have them played back to him. Furthermore, E-Mail or facsimile messages can be directed by the subscriber to a facsimile machine, shown as 31. Therefore, both access to the system and retrieval of information is not limited to a single technology, but can make use of a personal computer and modem connection, a telephone set connection, or a facsimile machine connection with one of the UniPost Access Nodes for both accessing a mailbox and retrieving the contents thereof. It can also be appreciated that the example shown in FIG. 3 has allowed the subscriber 12 to form a relatively local connection using the public switched telephone network 10 to contact the Tokyo UniPost Access Node 6. This is then connected to the Toronto UniPost Access Node 6 and the electronic mailbox of the subscriber via an Internet or dedicated data communication channel. Information is retrieved from the mailbox and provided to the UniPost Access Node, also by this data communication channel provided by Internet. In contrast to a single UniPost Access Node, the multiple access nodes, shown in FIG. 3, advantageously use the dedicated data communication network to interconnect the access nodes and reduces the need for long distance telephone communications with a particular computer. For example, if the UniPost Internet subscriber 12 in FIG. 3 was merely a subscriber to the generic Internet access provider shown as 8, he would have to use the local public switched telephone network as well as a long distance telephone network to access the generic Internet access provider 8. This access provider would then deliver the information back to the subscriber. This results in a long distance telephone communication which is not capable of transmitting the data at the same rate or accuracy as the Internet system and results in a system which is not as convenient or cost effective as the UniPost system described above. There can be a host of UniPost Access Nodes distributed throughout a country.

Figure 4:
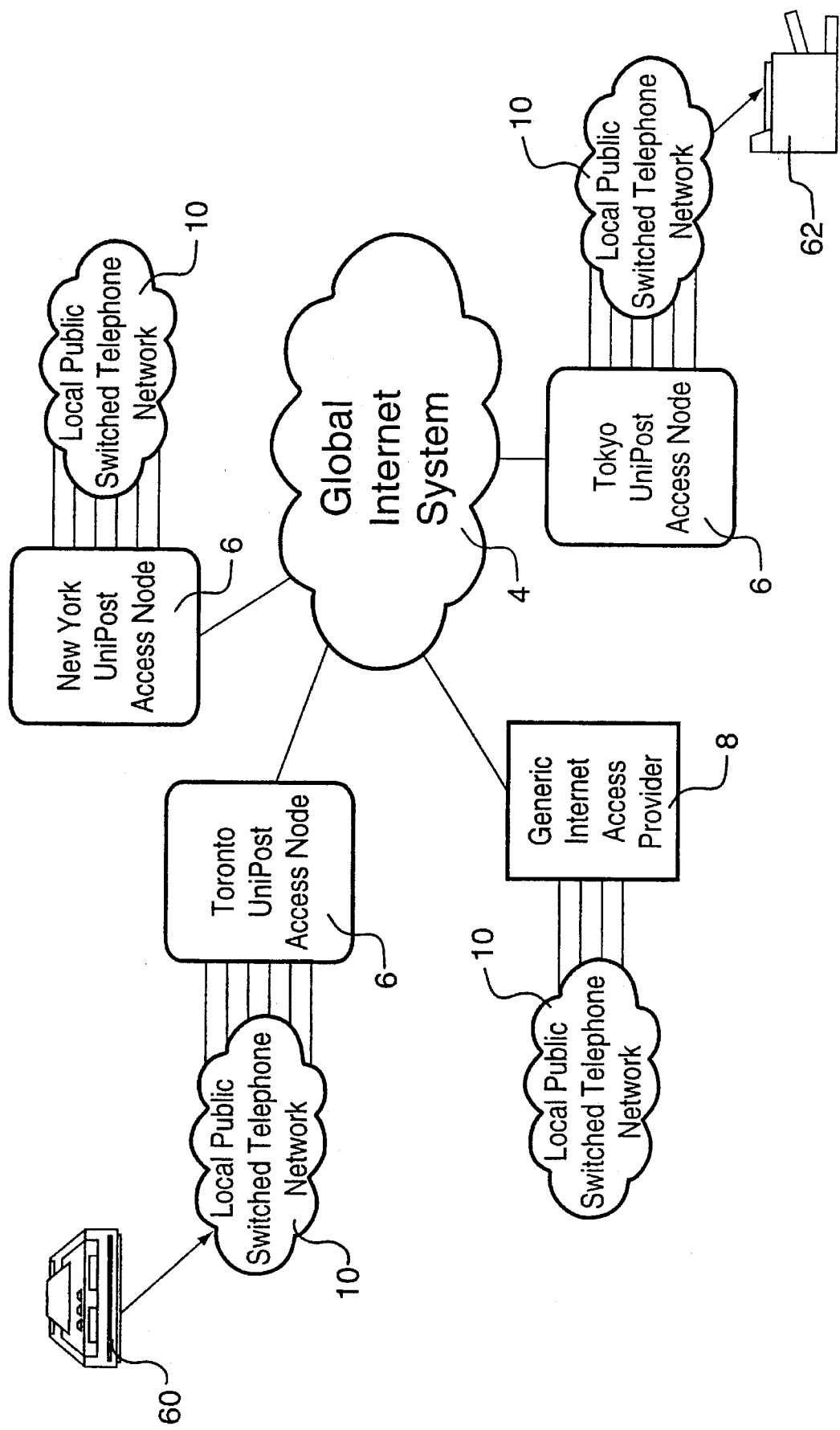
FIG. 4 is an overview showing an effective manner for delivering a facsimile in a cost effective manner.

FIG. 4 shows how a facsimile transmission addressed to a particular address in Japan can effectively use the UniPost access system. In this case, the transmission is sent from the facsimile machine 60 via the public switched telephone network 10 to the UniPost Access Node 6. The facsimile machine 60 can include add-on devices to cause this long distance call to be rerouted or the communication may first be made to the Toronto UniPost Access Node and thereafter to the Japanese address. Therefore, in this case, the user provides the direction to initiate the contact with the Toronto UniPost Access Node 6. The Toronto UniPost Access Node 6 recognizes that it is a transmission to be received in Japan, receives the transmission, and then uses the Internet data transmission system 4 to transfer the facsimile to the Tokyo UniPost Access Node 6. The Tokyo UniPost Access Node 6 then uses the public switched telephone network 10 to deliver the UniPost to the particular address identified in the original transmission. With this arrangement, the facsimile has been recognized as being a data transmission and redirected to make use of a data communication system and then receive the communication in a geographical location much closer whereby the local public switched telephone network may be effectively used. With this arrangement, the facsimile transmission is carried over a data communication channel the greatest distance and in a cost effective and accurate manner, and the public switched telephone network is then used to deliver the message. Similarly, a local connection with the public switched telephone network is used to deliver the message to the originating UniPost Access Node. Fortunately, with local lines, the cost is either free or inexpensive and typically the quality of the connection is quite high. Therefore, there is a reasonable connection, and thus, a relatively fast transmission between the original facsimile machine 60 and the Toronto UniPost Access Node 6. Similarly, there is a fairly efficient transfer at the other end between Tokyo UniPost Access Node 6 and the final facsimile machine indicated as 62. If the originating leg of the transmission is slow, it typically does not increase the cost substantially, as it is a local call. Similarly, if the last leg of the transmission is slow, it is not particularly expensive, as it is again a local call. By redirecting the transmission, the high quality of the data transmission network is utilized, and thus, the cost for this portion of the transmission is also low.

This would be in contrast to the same transmission which is sent over a public switched telephone network to the facsimile machine 62. In that case, because of the various steps and the fact that that system has not been designed specifically for data transmission, the transmission rates are quite low and are really determined by the originating facsimile machine, the receiving facsimile machine and the quality of the communication channel therebetween. Often, because of the very substantial distance involved, even if the originating facsimile machine and the receiving facsimile machine have high rates of data transfer, the communication channel can be the limiting link and result in very slow transmission speeds and quite high costs. There can be a substantial cost saving with the method described, and the elimination of busy signals for the sender which uses the data communication network for the most important portion of the communication path.

Figure 5:
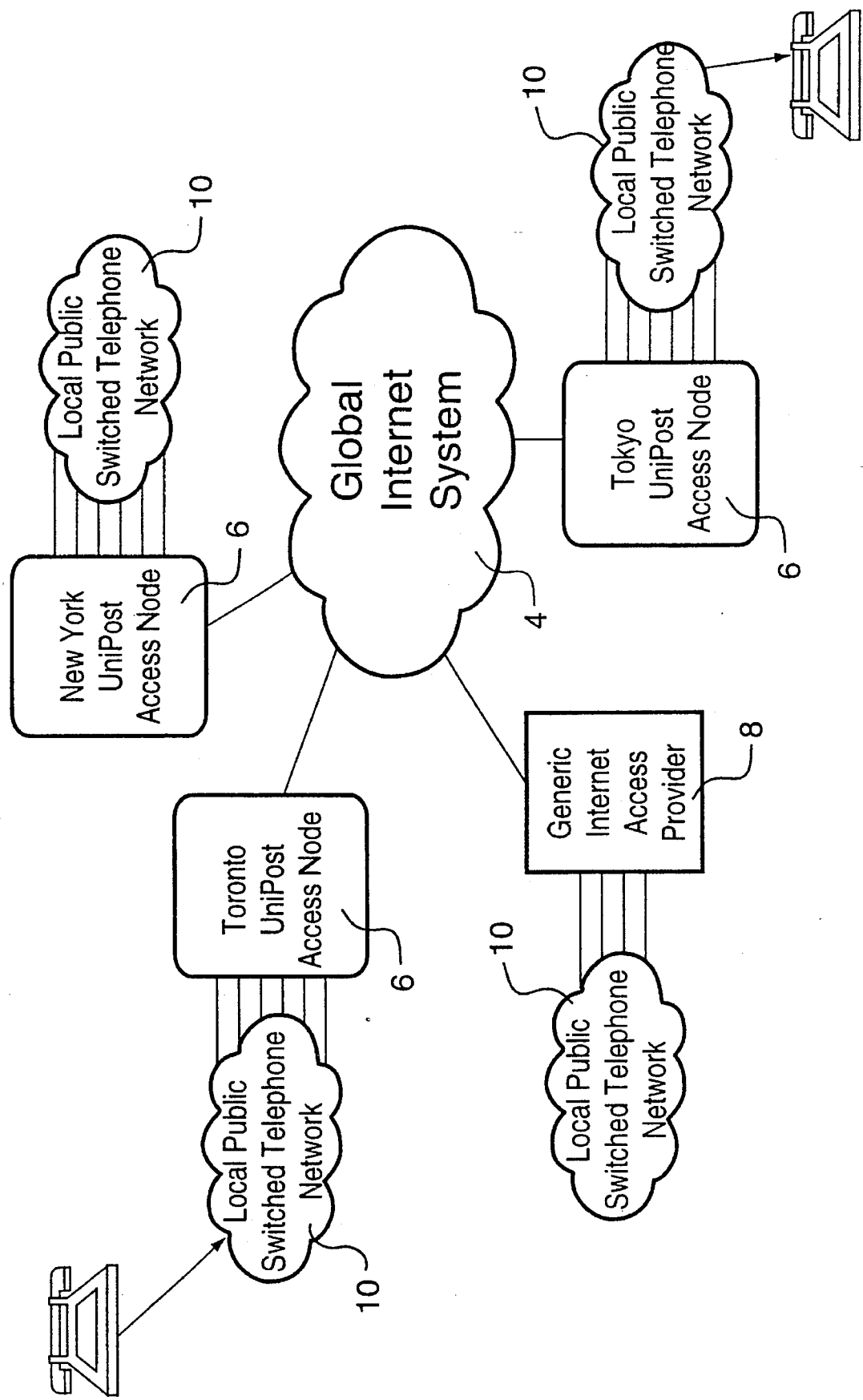
FIG. 5 shows a schematic of how the system can be used to complete a voice communication channel to a telephone set in a distant geographical location.

FIG. 5 also shows how this UniPost system can be used for providing a direct telephone link using the data transmission network involving Internet. In this case, voice is transmitted digitally and a live communication is maintained between Toronto UniPost Access Node 6 and Tokyo UniPost Access Node 6. Each of these have formed a live communication with the originating telephone set and the receiving telephone set. This can thus provide the subscriber with a further cost advantage in completing his international communications or other long distance communications.

The discount long distance voice messaging requires that each UniPost Access Node is able to accept and digitize voice calls. The actual data communication link utilizes protocols and routing logic which ensures that the digitized voice packets remain in sequence from sender to recipient. As with long distance facsimile calls, the call originator will dial the local UniPost Access Node and enter his account and the number of the recipient. The UniPost Access Node will establish a packet path between the originating UniPost Access Node and the destination UniPost Access Node closest to the recipient. The destination UniPost Access Node will then place a local call to the recipient and deliver the voice message.

The present system also allows UniPost to encrypt transmissions between UniPosts and avoid inadvertent disclosure to others. For example, encryption and decryption are carried out by UniPost using state of the art technology, and thus, the transmission over Internet or other data networks is protected. This security is provided transparently to the sender and the receiver and provides security generally corresponding to traditional non-encrypted facsimile transmissions. Additional security can include predetermined encryption of the communication on either of the first or last telephone legs of the communication. For example, communications between a subscriber and UniPost can be encrypted in a predetermined manner and, if desired, the last leg can be encrypted in a predetermined manner. A subscriber can specify or choose various levels of security for different messages or retrieval of different messages.

As previously described, the system can also utilize other technology for forced delivery of any of the communications. This typically involves a signal being sent to the subscriber which is not necessarily a telephone based signal. For example, pager communications can be used where the terminal recognizes that its address is included in the broadcast signal and provides proper alert. This alert can be recognized by the machine to complete a communication to the UniPost Access Node or it can merely alert the actual human subscriber. It is also possible for the access node to use voice notification where the UniPost Access Node outdials a prespecified telephone number and plays a voice message indicating that a message has been received. Depending upon the number specified, a voice message may be played back to a normal telephone or into a voice mail system.

The present invention also has particular application as a back-up system used in combination with call forwarding technology. In this way, businesses can have this as a back-up where if a particular number is busy or not answered, the call is forwarded to the UniPost Access Node, which accepts the call and then eventually causes it to be transmitted out to the particular party or is available for retrieval. Multiple reception of various types of communication is provided without the subscriber adding further communication.

There are other digital data networks other than Internet which can also be utilized and Internet is described herein as it is the most common and perhaps has the widest subscribers of E-Mail. The invention is not limited to the Internet. The drawings have also referred to various UniPosts in different countries, but it can well be appreciated that various UniPosts can be provided throughout a large geographical area, such as the United States. UniPost Access Nodes could be provided in Los Angeles, Washington, New York, Chicago, New Orleans, etc. In fact, UniPost Access Nodes may be desirable in all major cities. It is also possible to use a single facility and have a 1-800 or other toll-free number for a particular region, country or group of countries.

The following provides an example of the type of summary with which a user can be provided when he uses a computer to retrieve his messages from a UniPost Access Node. As can be appreciated, the UniPost Access Node can also provide a verbal summary of the various transmissions received as it includes synthesized voice transmission.

By combining all messaging types in a single or centralized confidential source, the UniPost subscriber can utilize his PC as the receiving terminal for all his messages.

For example, a Toronto-based subscriber travelling to Japan with a laptop PC would click on the UniPost software in his PC, identifying UniPost Japan, causing the modem to dial the Tokyo UniPost Access Node (UAN) and identify the subscriber (FIG. 3). The UAN would then display on the PC a directory of mailbox contents, for example:

| TYPE | DATE | TIME | LENGTH | SENDER ID | STATUS |
|---|---|---|---|---|---|
| Voice | 10 Sep 94 | 11:34:22 | 2.2 min | 212-546-9112 | Not Played |
| Voice | 11 Sep 94 | 08:13:41 | 3.5 min | 638-9223 | Not Played |
| Voice | 11 Sept 94 | 14:56:17 | 1.5 min | Unknown Caller | Played |
| Facsimile | 09 Sep 94 | 10:04:31 | 5 Pages | Acme Fireworks | Rec OK |
| Facsimile | 10 Sep 94 | 11:34:51 | 7 Pages | 313-756-7781 | Viewed |
| Facsimile | 11 Sep 94 | 15:07:27 | 3 Pages | Benton-Cleary | Rec OK |
| Text File | 08 Sep 94 | 09:23:12 | 4235 Bytes | kjohnson@terratek.com | Rec OK |
| Binary File | 09 Sep 94 | 12:34:51 | 125912 Bytes | CIS:77605.171 | Rec OK |
| Video | 10 Sep 94 | 15:35:10 | 28 Seconds | tbailey@vidclips.com | Rec OK |

While viewing the current mailbox directory, the subscriber can select any message for playback or display, as follows:

- A voice message can be played back through the PC speaker or sent to a telephone.
- A fax message can be displayed, annotated, rotated, edited, cleaned, or retransmitted.
- A full motion video file can be viewed using a video playback application.
- Any other file type can be processed by the appropriate application in the subscriber's PC, such as a text editor, word processor, spreadsheet, graphics viewer, or database.

The subscriber can select individual messages for downloading, deleting, forwarding, or broadcasting.

By delivering all message types into the PC, the subscriber is able to save voice, fax, video, E-Mail, and other messages types under any subdirectory within his PC. Therefore, the subdirectory associated with, for example, a particular client could contain voice messages, facsimiles, video clips, E-Mail, or any other file type associated with that client.

Because of the distributed UANs, the travelling subscriber is not forced to make a long distance call from a telephone back to his home voice mail system in order to retrieve his messages. A single local call delivers all message types to his PC. A traveller using an office voice mail system, or a voice mail service offered by his local telephone company, will always have to call back to his home city in order to retrieve messages. This approach also applies within a country.

The present invention is not limited to the use of land based telephone lines and is used with cellular or other accepted telephone transmission arrangements or other two-way communication arrangements.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A communication system comprising a plurality of commercial access providing computers where each commercial access providing computer is associated with INTERNET to allow subscribers to use the services offered by INTERNET, said communication system having many registered subscribers who are collectively unrelated and each subscriber is associated with one of said commercial access providing computers, providing each subscriber with an E-mail address for INTERNET, a fax address telephone address and a voice mail telephone address, where a message addressed to any of the addresses results in said associated commercial access providing computer receiving and storing the addressed message for retrieval by the respective subscriber, said commercial access providing computers allowing each subscriber to access and retrieve messages stored on his behalf or a summary of messages stored on his behalf by using either a telephone set which forms a telephone communication with said associated commercial access providing computer or using a computer and modem which forms a telephone communication with one of said commercial access providing computers, and wherein said plurality of commercial access providing computers use INTERNET to exchange information therebetween, and wherein subscribers of the system can access any of said commercial access providing computers for retrieval of messages stored on behalf of a subscriber, said commercial access providing computers cooperating such that messages stored for a subscriber in said associated computer are transferred using INTERNET from said associated access providing computer to one of the other commercial access providing computers which has been contacted by the subscriber for retrieval of communications stored on his behalf.

2. A communication system as claimed in claim 1 wherein retrieval of messages stored on behalf of a subscriber includes using a facsimile machine which forms a communication with said commercial access providing computer and delivers the messages to the facsimile machine.

3. A communication system as claimed in claim 2 wherein said commercial access providing computer broadcasts an alert signal to advise receiving equipment of subscriber that a message has been received by said commercial access providing computer on behalf of said subscriber.

4. A communication as claimed in claim 1 wherein some of said subscribers have received E-mail messages addressed to the subscriber automatically converted by said commercial access providing computer to a facsimile format and forwarded as a facsimile transmission to a facsimile address of the subscriber.

5. A communication system as claimed in claim 1 wherein use of said fax address and said voice mail address are telephone numbers which when used form a communication with said commercial access providing computer over one of many direct in dial telephone lines.

6. A communication system as claimed in claim 1 wherein said commercial access providing computer provides each subscriber the capability to receive an audible summary of messages received for the subscriber using a telephone communication between the subscriber and said commercial access providing computer.

7. A communication system as claimed in claim 1 wherein said computers are located in different geographic areas where it is cost effective to use INTERNET to communicate between said commercial access providing computers when a subscriber contacts said other computer for retrieval of messages stored on his behalf.

8. A communication system as claimed in claim 1 wherein each subscriber has the ability to contact said commercial access providing computers and have said computers use INTERNET for long distance voice transmission of telecommunications of a subscriber.

9. A method of receiving voice, E-mail, and facsimile messages addressed to a subscriber which messages are received by a computer system connected to a data communication network through which E-mail is received and transmitted and wherein the computer system has a plurality of commercial access providing computers interconnected by said high speed data communication network, each commercial access providing computer including many direct in dial telephone lines connected to a public switched telephone network by means of which facsimile messages and voice messages are received and transmitted, and wherein any of the subscribers may retrieve messages stored on his behalf using said public switched telephone network and said date communication network directly associated with said computer system or using said public switched telephone network to form a direct connection with any of said commercial access providing computers of said computer system for retrieval of messages with said computers communicating the messages therebetween through said data communication network.

10. A method as claimed in claim 9 wherein said computers each receive messages from subscribers sent thereto for more cost effective transmission, said received messages being addressed to a particular telephone address, and wherein said messages are routed using said data communication network to one of said computers located in closer proximity to the telephone address and wherein said one computer forwards the message to said telephone address using a public switched telephone network.

11. A unified messaging system comprising a computer system having a plurality of commercial access providing computers interconnected by a high speed data communication network for digital data transmission, each commercial access providing computer including a bank of direct in dial telephone lines associated with a public switched telephone network and acting as a commercial access provider for said high speed data communication network through which E-mail is delivered, said computer system providing each subscriber with an E-mail address for data communication access, a fax telephone address and a voice mail telephone address, where a message addressed to any of the addresses results in the computer system receiving and storing the addressed message for retrieval by the respective subscriber, said computer system being accessible to any subscriber using said public switched telephone network and/or said high speed data network for retrieval of messages stored on behalf of said subscriber or a summary of said messages whereby said subscribers may contact any of said commercial access providing computers for of voice mail. E-mail or facsimile messages received on its behalf by said computer system which messages, if necessary, are exchanged between any of said commercial access providing computers over the data communication network.

12. A communication system as claimed in claim 11 wherein use of said fax telephone address or said voice mail telephone address of some subscribers attempts to make a communication with equipment of the particular subscriber and, if unsuccessful, is automatically call forwarded to said commercial provider for receiving and storing.

13. A communication system as claimed in claim 12 wherein said voice mail address and said fax mail address are the same address and said computer system distinguishes between a facsimile message and a voice message and provides appropriate prompts for receiving and storing the appropriate message.

14. A communication system as claimed in claim 11 wherein said computer system converts at least some of said messages into an E-mail or a facsimile message and cooperates with equipment used by subscribers for automatic delivery of received and stored messages.

15. A communication system as claimed in claim 11 wherein said computer system has at least some subscribers where E-mail and facsimile messages are automatically converted to either E-mail or facsimile format and then forwarded to the subscriber.

16. A communication system as claimed in claim 11 wherein said computer system provides a summary of messages received on behalf of a subscriber which summary can be retrieved as a voice message.

17. A communication system as claimed in claim 11 wherein said computer system provides a summary of messages received on behalf of a subscriber which summary can be retrieved as voice mail, E-mail or a facsimile message.

18. A communication system as claimed in claim 17 wherein said computer system includes a conversion arrangement whereby a received facsimile transmission can be stored and retrieved as a text file, or a received text file can be retrieved as a facsimile message.

* * * * *